United States Patent [19]

Badertscher et al.

[11] 4,112,132

[45] Sep. 5, 1978

[54] BUTTER-LIKE FOOD PRODUCT

[75] Inventors: Ernest Badertscher, Orbe; George Anthony Easton, Chardonne, both of Switzerland

[73] Assignee: Societe d'Assistance Technique pour Produits Nestle S.A., La Tour de Peilz, Switzerland

[21] Appl. No.: 710,223

[22] Filed: Jul. 30, 1976

[30] Foreign Application Priority Data

Jul. 31, 1975 [CH] Switzerland .......................... 9984/75

[51] Int. Cl.² ............................................. A23D 3/02
[52] U.S. Cl. .................................. 426/603; 426/613
[58] Field of Search ................................. 426/603, 613

[56] References Cited

U.S. PATENT DOCUMENTS

| | | | |
|---|---|---|---|
| 755,843 | 3/1904 | Campbell | 426/603 X |
| 2,217,309 | 10/1940 | Epstein et al. | 426/603 X |
| 3,366,492 | 1/1968 | Voss et al. | 426/603 |
| 3,922,376 | 11/1975 | Strinning et al. | 426/603 |
| 3,962,464 | 6/1976 | Sozzi | 426/603 X |

*Primary Examiner*—Robert A. Yoncoskie
*Attorney, Agent, or Firm*—Watson, Leavenworth, Kelton & Taggart

[57] ABSTRACT

A process for the production of an edible product of the butter or margarine type, which comprises thoroughly mixing a medium containing fats and an aqueous medium having a viscosity of from 2000 to 20,000 centipoises, as measured at a temperature between 20° C and 30° C, at a temperature in the range from about 15° to 45° C, resulting directly in the formation of an emulsion of the water-in-oil type which represents the edible product of the butter or margarine type.

Application to the production of an edible product having a fat content of from 35% to 90%.

14 Claims, No Drawings

BUTTER-LIKE FOOD PRODUCT

This invention relates to a process for the production of an edible product of the butter or margarine type.

Butter is an edible fat of prime importance which is distinguished by an unctuosity greatly appreciated by consumers. This unctuosity, which is partly a result of the thermal softening and fusion characteristics of the lactic materials that make up butter, is attributable above all to the fact that butter is an emulsion of the water-in-oil type (hereinafter referred to by the expression "W/O emulsion"). Margarines, which are based on vegetable fats, are also W/O emulsions.

There are numerous processes for the production of edible products of the butter or margarine type, i.e. reconstituted "butters" or margarines with variable percentages of fats, by mixing the various constituents (mainly water and fats). German Offenlegungsschrift No. 2,245,814 and Belgian Patent Specification No. 815,923 for example both describe processes of this type. However, the temperatures applied during mixing of the constituents are such that the product obtained is of necessity in the form of an emulsion of the oil-in-water type (hereinafter referred to by the expression "O/W emulsion"). The O/W emulsion has to be subsequently converted into a W/O emulsion by an operation known as "phase inversion" which is delicate and difficult to control.

The present invention obviates this disadvantage. It relates to a process for the production of an edible product of the butter or margarine type, which comprises thoroughly mixing a medium containing fats and an aqueous medium with a viscosity of from 2000 to 20,000 centipoises, as measured at 20° to 30° C., at a temperature in the range from about 15° C. to 40° C., resulting directly in the formation of an emulsion of the water-in-oil type which represents the edible product of the butter or margarine type.

In the context of the invention, a "medium containing fats" is a fatty medium consisting entirely or mostly of fats aside from a little water or water containing salts, advantageously fats having a melting point below or equal to 35° C., so as to obtain a product which always has the unctuous and melting properties of a butter or margarine. The choice of the fats is essentially governed by the type of product which it is desired to produce, and it is possible to use both animal fats and vegetable fats or mixtures thereof. In the context of the invention, preferred fats include butter oil, fractionated butter oil, especially the oleic fractions of butter oil, butter itself (80% of fats and approximately 20% of water), soya oil, sunflower oil, corn oil, peanut oil, lard, "prime juice" beef fat, etc., used either individually or in admixture with one another. The medium containing fats may of course also contain other ingredients in small amounts, such as colouring agents, flavouring agents, antioxidants, preservatives, vitamins, etc.

An aqueous medium with a viscosity of from 2000 to 20,000 centipoises may be obtained in various ways, for example by means of thickeners such as agar gum or alginates. However, it is preferred to dispense with a thickening agent and to use, as the aqueous medium, a medium containing proteins, especially a medium containing proteins of lactic origin and, if necessary, other ingredients such as food-grade salts, acids or alkalis, etc., depending upon the characteristics which it is desired to impart to the end product. The constituents of the aqueous medium may with advantage be selected from the following materials, so as to obtain a viscosity of from 2000 to 20,000 centipoises:

water, whole milk, skimmed milk, yoghurt, acidified milk, cream, whey, buttermilk, whole milk powder, skimmed milk powder, yoghurt powder, acidified milk powder, caseins, caseinates, for example acid casein, rennet casein, caseinates of calcium and sodium, disodium carbonate, sodium hydroxide, citric acid, lactic acid, sorbic acid, colorants, for example $\beta$-carotene, Annatto yellow, flavours, preferably "natural" or "natural identical" flavours, distillate of lactic cultures, cultures such as lactic cultures capable of gradually developing desirable tastes or flavours.

The total concentration in the aqueous medium of constituents such as caseins or caseinates is normally of the order of 2% to 18% by weight and preferably of the order of 12% to 18% by weight.

Before the principal factors capable of governing the viscosity of an aqueous medium of the kind in question are discussed, it is pointed out that the upper viscosity limit should preferably be considered in conjunction with the nature of the medium containing the fats. If, as already mentioned, the medium containing fats also contains water, the entire viscosity range from 2000 to 20,000 centipoises for the aqueous medium may be used without any significant difficulties. If, on the other hand, as has also been mentioned, the medium containing fats does not contain any water, it is of advantage in practice to keep to a viscosity range from 2000 to 5000 centipoises and preferably from 2000 to 4000 centipoises. This advantageous reduction of the viscosity range is not associated with the process either in its principle or in its effects, but derives from technological reasons (ease of working).

The viscosity of an equeous medium such as defined above depends on numerous factors which are closely related. These factors are above all temperature (it is for this reason it is stipulated that the viscosity of the medium should be between 2000 and 20,000 centipoises for a temperature in the range from 20° C. to 30° C.), the nature and respective proportions of the constituents and pH. The pH is not normally variable within a wide range because, depending upon the constituents used, it is not always possible to obtain an aqueous medium having a given viscosity (measured at 20° C. to 30° C.) at any pH-value. For example, in the case of an aqueous medium containing, as its main constituents, acid casein and calcium caseinate in a quantity of 12% by weight and salts, such as those mentioned above, in a quantity of 1% by weight, it is impossible in practice to fix viscosity between 2000 and 5000 centipoises (at 20° C. to 30° C.) for pH-values outside the range from 6.8 to 7.6. For aqueous media such as these, pH-values in the range from 7 to 7.5 are preferred.

Nevertheless, in cases where it is desired to exceed the above-mentioned range for producing a product with a particular character, for example a highly acid product, it is possible to add an acidifying agent either during mixing or immediately before mixing in one or the other medium, or even indirectly in emulsion with the medium containing fats, so that the acidifying agent does not have the opportunity or the time to react correctly with the aqueous medium to modify its viscosity to any significant extent and to take it beyond the range of 2000 to 20,000 centipoises.

The temperature at which the thorough mixing operation is carried out is a critical factor which is closely related to the nature of the fats used. This mixing temperature has to be such that the fats are neither in a partially crystallised state nor in a partially molten state. If the temperature is too low so that the fats are partially crystallised, the product obtained has a sandy or curdled character and is unpleasant to eat. In addition, there is a risk during production of damage to or blockage of the installations used, in particular at the mixing stage. If the temperature is too high, it is not the required product (W/O emulsion) which is obtained, but instead the undesired product i.e. a product in the form of an O/W emulsion.

In general, the temperatures applied during the thorough mixing operation, in the case of the fats mentioned above, are of the order of 15° C. to 45° C. and preferably of the order of 20° C. to 35° C. in cases where it is desired to produce a product which faithfully reproduces the characteristics of butter.

The proportions of the medium containing fats and of the aqueous medium which are thoroughly mixed are not critical factors in the process according to the invention. It has been found that it is readily possible to produce stable products of the butter or margarine type which contain as little as 35% by weight of fats. The proportions are merely defined or calculated in dependence upon the composition of the product which it is desired to obtain, if necessary taking into account the fact that, for example, the medium containing fats also contains water (which is particularly the case with butter containing approximately 17 to 20% of water) or the fact that it is intended to add a food-grade acid in aqueous solution during the mixing operation.

In addition to the food-grade acid mentioned above, colorants, flavours, etc. may also be added during mixing.

In one advantageous embodiment of the process according to the invention, products of the butter or margarine type containing from 35% to 95% of fats are produced. Some examples of these preferred products are given purely by way of illustration in the following:

butter substitute with approximately 80% of fats consisting of oleic fractions of butter oil, low calorie butter with 40% to 60% of fats, low calorie butter substituted with 40% to 60% of fats consisting of vegetable oils rich in polyunsaturated compounds.

Products of this kind are of interest on the dietetic plane by reason of their low calorie content.

The process according to the invention is particularly suitable for continuous working, in which case an apparatus, e.g., a scraped surface heat exchanger, capable of carrying out the mixing operation is used, and at least with the medium containing fats and with aqueous medium, both at suitable temperatures, is fed through two pipes equipped with pumps enabling their throughputs to be controlled or where the product issuing from the element is intended to feed a filling machine. Continuous working such as this may be carried out in a sealed production line which enables sterilised products with good keeping qualitites to be produced. In this case, it is advisable to sterilise each of the media separately, to bring them to the appropriate temperature, in the range from 15° C. to 40° C., to mix them thoroughly and finally to package the product thus obtained by means of an aseptic filling machine. Similarly, each of the media may be separately pasteurised before mixing.

The products of the butter or margarine type obtained by the process according to the invention have a texture similar to that of butter or margarine (W/O emulsion). Even the "low calorie" products containing only 40% of fats are in the form of thick pastes like butter. This texture remains stable for several months without any exudation of water. They are easy to spread and, providing the fats used have been suitably selected, have the advantage of being spreadable directly from the refrigerator.

The process according to the invention is illustrated by the following Examples, in which the percentages and proportions quoted are by weight.

EXAMPLES

An aqueous medium containing ingredients as set forth in the following examples is prepared and then pasteurised for 2 seconds at 150° C. The medium is then degassed by expansion in vacuo at 50° C., followed by cooling to 25° C. by means of a scraped surface heat exchanger.

A medium containing fats such as those mentioned above is also prepared. In variant A, this medium is pasteurised for 30 seconds at 80° C. and then cooled to 30° C. In variant B, the medium is pasteurised or sterilised by the injection of steam at 125 to 140° C.

Each of the two media are cooled to 25° C. in scraped surface heat exchangers and then continuously mixed in an exchanger, again with a scraped surface, in proportions corresponding to the end product which it is desired to obtain, and indicated hereinafter. The end product is immediately packaged in hermetic boat-shaped containers and then stored in a refrigerator.

EXAMPLE 1

The aqueous medium used is obtained by mixing 45 kg of water, 3.5 kg of acid casein, 2.9 kg of calcium caseinate, 100 g of cooking salt, 200 g of sodium citrate and 80 g of sorbic acid at 70° C. and neutralising the resulting mixture to pH 7.3 with sodium carbonate. Viscosity: 3800 centipoises as measured at 20° C.

The medium containing fats consists of butter (81% of fats and 17.5% of water) pasteurised in molten form in accordance with variant A.

The two media are mixed in the following proportions at a temperature of 25° C.:

for 1 part of medium containing fats, 1.3; 1; 0.6; 0.33; 0.15 and 0.01 parts, respectively, of aqueous medium.

The various products obtained, containing 35%, 40%, 50%, 60%, 70% and 80%, respectively of fats are W/O emulsions like butter or margarine. They are stable and keep without problems for 3 months.

Similar products with a more distinct butter note are obtained by using, as the medium containing fats, a butter to which 500 ppm of a butter flavour have been added in molten form.

COMPARISON EXAMPLES 1a to 1c (a) An aqueous medium is prepared in the same way as in Example 1, but without neutralisation to pH 7.3. This medium has a viscosity of approximately 100 centipoises. This medium is then mixed with butter in a quantity of 1 part to 1 part of butter. It is found that, irrespective of the mixing temperature, namely 15° C., 20° C., 25° C. or 30° C. a product in the form of an O/W emulsion is always obtained.

(b) The test described above is repeated with an aqueous medium similar to that of Example 1, but without any calcium caseinate (viscosity = approximately 1000 centipoises). It is again found that the products obtained are O/W emulsions irrespective of the proportions and temperatures applied during mixing.

(c) The procedure is as in Example 1, except that the two media are mixed at a temperature of 50° C., i.e. at a temperature at which the butter is in molten form. Irrespective of the proportions used for mixing, the products obtained are again O/W emulsions, although the aqueous medium had the appropriate viscosity.

EXAMPLES 2 to 6

These Examples are summarised in the following Table, the aqueous media used being respectively:
Examples, 2, 4 and 6: as Example 1
Examples 3 and 5: the acid casein (3.5 kg) and the calcium caseinate (2.9 kg) are replaced by sodium caseinate (9.5 kg).

In every case, products with the texture of butter or margarine are obtained.

| Example | Aqueous medium (M1) | Medium containing fats (M2) | Variant of pasteurisation or sterilisation | Mixing proportions (M1/M2) | % fats in end product |
|---|---|---|---|---|---|
| 1 (Recap) | See text | Butter | A | 1.3 | 35 |
|  |  |  |  | 1 | 40 |
|  |  |  |  | 0.6 | 50 |
|  |  |  |  | 0.33 | 60 |
|  |  |  |  | 0.15 | 70 |
|  |  |  |  | 0.01 | 80 |
| 2 | As Example 1 | Butter oil | A | 1.5 | 40 |
| 3 | See text | Butter oil 70 % butter oil fractionated at 15° C 30 % | B, 135° C, 10 s sterilisation | 1.5 | 40 |
| 4 | As Example 1 | Butter oil 65 % soya oil 35 % | B, 125° C, 2 s pasteurisation | 1 | 50 |
| 5 | As Example 3 | Butter oil 70 % corn oil 30 % | A | 1.2 | 45 |
| 6 | As Example 1 | Prime juice beef fat | A | 1.5 | 40 |

EXAMPLE 7

The procedure is as described at the beginning of the Examples, except that 1 N lactic acid is continuously added at a rate of 40 cc/minute for an output of 6 kg/minute of end product. The addition is made in the medium containing fats immediately before mixing.

The aqueous medium used is the same as in Example 1.

The medium containing fats is butter.

The product obtained by thorough mixing has the texture of butter or margarine.

COMPARISON EXAMPLE 7

An aqueous medium is prepared in the same way as in Example 7, 1 N lactic acid being added thereto. The aqueous medium containing fats is butter.

These two media are then mixed in the same way as already described and it is found that the product obtained does not have the texture of butter or margarine. This product is an O/W emulsion.

This is due to the fact that the lactic acid, having had time to act in the aqueous medium, lowered the pH-value thereof to pH 6.6, the viscosity of the aqueous medium then no longer being within the permitted limits (cf. Comparison Example 1a).

EXAMPLE 8

The procedure is as described at the beginning of the Examples using a medium consisting of a 2% solution of agar gum in water and a medium containing fats consisting of butter oil.

After thorough mixing, a product is obtained in the form of a W/O emulsion like butter or margarine.

We claim:

1. A process for the production of an edible product of the butter or margarine type, which comprises thoroughly mixing, at a temperature in the range from about 20° C. to 35° C., a medium comprising fats, and an aqueous medium having a viscosity of from 2,000 to 20,000 centipoises, as measured at a temperature between 20° centipoises, as measured at a temperature between 20° C. and 30° C., said mixing temperature being such that the fats exist in neither a partially crystallized state nor in a partially molten state, resulting directly in the formation of an emulsion of the water-in-oil type having a fat content of 35% to 90% which represents the edible product of the butter or margarine type.

2. A process as claimed in claim 1, wherein the medium comprising fats is butter.

3. A process as claimed in claim 1, wherein the medium comprising fats is butter oil, oleic fractions of butter oil, vegetable oil or animal fat.

4. A process as claimed in claim 1, wherein the aqueous medium has a viscosity of from 2000 to 5000 centipoises as measured at a temperature between 20° C. and 30° C.

5. A process as claimed in claim 1, wherein the aqueous medium has a viscosity of from 2000 to 4000 centipoises as measured at a temperature between 20° C. and 30° C.

6. A process as claimed in claim 1, wherein the aqueous medium is a medium containing effective amounts of protein.

7. A process as claimed in claim 6, wherein the protein is casein or a caseinate.

8. A process as claimed in claim 7, wherein the concentration of casein or caseinate in the aqueous medium amounts to from 2% to 18% by weight.

9. A process as claimed in claim 8, wherein the concentration of casein or caseinate in the aqueous medium amounts to from 12% to 18% by weight.

10. A process as claimed in claim 1, wherein the aqueous medium has a pH-value of from 7 to 7.5.

11. A process as claimed in claim 1, wherein the fat and aqueous media are subjected to one of (a) pasteurization, (b) sterilization and (c) pasteurization and sterilization treatment before mixing.

12. A process as claimed in claim 1, wherein an effective amount of a food-grade acid is added during the mixing of the two media.

13. A process as claimed in claim 1, wherein an effective amount of a food-grade acid is added to one or the other medium immediately before their mixing.

14. A process as claimed in claim 1, having a fat content of from 40% to 60%.

* * * * *